US 11,287,846 B2

(12) United States Patent
Chen et al.

(10) Patent No.: US 11,287,846 B2
(45) Date of Patent: Mar. 29, 2022

(54) HEAD-MOUNTED DISPLAY

(71) Applicants: STARVR CORPORATION, New Taipei (TW); Acer Incorporated, New Taipei (TW)

(72) Inventors: Chun-Yu Chen, New Taipei (TW); Ker-Wei Lin, New Taipei (TW); Chun-Ta Chen, New Taipei (TW); Hao-Ming Chang, New Taipei (TW); Chun-Hsien Chen, New Taipei (TW); Jen-Chieh Shih, New Taipei (TW); Chih-Heng Tsou, New Taipei (TW); Hui-Ping Sun, New Taipei (TW); Wei-Chih Wang, New Taipei (TW); Yen-Chou Chueh, New Taipei (TW); Kuan-Lin Chen, New Taipei (TW)

(73) Assignees: STARVR CORPORATION, New Taipei (TW); Acer Incorporated, New Taipei (TW)

( * ) Notice: Subject to any disclaimer, the term of this patent is extended or adjusted under 35 U.S.C. 154(b) by 102 days.

(21) Appl. No.: 16/261,595

(22) Filed: Jan. 30, 2019

(65) Prior Publication Data
US 2020/0042035 A1 Feb. 6, 2020

(30) Foreign Application Priority Data
Aug. 1, 2018 (TW) ................................. 107126678

(51) Int. Cl.
*G06F 1/16* (2006.01)
(52) U.S. Cl.
CPC .................... *G06F 1/163* (2013.01)

(58) Field of Classification Search
CPC . G06F 1/163; G06F 3/011; G02C 3/02; A42B 3/185; A61F 9/027;
(Continued)

(56) References Cited

U.S. PATENT DOCUMENTS 5,572,749 A  11/1996  Ogden
7,120,939 B1 * 10/2006  Howard .................. A42B 3/14
                                                              2/416
(Continued)

FOREIGN PATENT DOCUMENTS

CN     101419339     4/2009
CN     203139533     8/2013
(Continued)

*Primary Examiner* — Nathan J Newhouse
*Assistant Examiner* — Matthew T Theis
(74) *Attorney, Agent, or Firm* — JCIPRNET (57) ABSTRACT

A head-mounted display includes a host, two installing bases, two connection elements and a head belt. The host has two installing grooves and two opposite sidewalls, and the two installing grooves respectively penetrate through the two sidewalls. The two installing bases are disposed in the host, wherein each installing base has an abutting portion and an installing portion connected to each other. The abutting portion of each installing base abuts against an inner edge of the corresponding sidewall, and the installing portion of each installing base is exposed outside of the host through the corresponding installing groove. The two connection elements are respectively installed onto the two installing portions of the two installing bases. The head belt has two opposite connection portions, and the two connection portions are respectively connected to the two connection elements.

20 Claims, 8 Drawing Sheets

(58) Field of Classification Search
CPC ........ G02B 2027/0178; G02B 27/0176; B63C 2011/128; Y10T 24/47
USPC ........................................................ 224/181
See application file for complete search history.

(56) References Cited

U.S. PATENT DOCUMENTS

| | | | |
|---|---|---|---|
| 2007/0234526 A1* | 10/2007 | Chen | A61F 9/027 24/265 R |
| 2014/0347794 A1 | 11/2014 | Pombo | |
| 2016/0004085 A1 | 1/2016 | Stroetmann | |
| 2017/0090514 A1* | 3/2017 | Byun | G02B 27/0176 |

FOREIGN PATENT DOCUMENTS

| | | |
|---|---|---|
| CN | 104793338 | 7/2015 |
| CN | 204945492 | 1/2016 |
| CN | 205039959 | 2/2016 |
| CN | 106257320 | 12/2016 |
| CN | 206193358 | 5/2017 |
| CN | 107290859 | 10/2017 |
| CN | 107783295 | 3/2018 |
| EP | 3147748 | 3/2017 |
| KR | 20170037210 | 4/2017 |
| TW | 487892 | 5/2002 |
| TW | 508454 | 11/2002 |
| TW | M300528 | 11/2006 |
| TW | 201400868 | 1/2014 |
| TW | I555561 | 11/2016 |
| TW | I626470 | 6/2018 |
| WO | 2004063788 | 7/2004 |
| WO | 2008141957 | 11/2008 |

* cited by examiner

HEAD-MOUNTED DISPLAY

CROSS-REFERENCE TO RELATED APPLICATION

This application claims the priority benefit of Taiwan application serial no. 107126678, filed on Aug. 1, 2018. The entirety of the above-mentioned patent application is hereby incorporated by reference herein and made a part of this specification.

BACKGROUND OF THE INVENTION

Field of the Invention

The invention relates to a display, and particularly relates to a head-mounted display.

Description of Related Art

The so-called virtual reality refers to the use of computer simulation to generate a three-dimensional virtual environment, so as to provide a user with sensory simulations such as vision, smell or touch. Thus, the user can have an immersive sense.

In general, the user needs to obtain an image of the three-dimensional virtual environment via a head-mounted display. The head-mounted display may be roughly divided into two parts of a host and a head belt. The head belt is mostly pivoted to the host via a pivot or locked to the host via a screw, which is not convenient to wear or remove the head belt for the user and the process is time consuming. On the other hand, in the process that the user wears the head-mounted display, the weight of the head-mounted display is applied to the head and face of the user. If the weight distribution is uneven, the discomfort when the user wears the head-mounted display will be increased.

SUMMARY OF THE INVENTION

The invention provides a head-mounted display, which has good convenience in use and wearing comfort.

An embodiment of the invention provides a head-mounted display including a host, two installing bases, two connection elements and a head belt. The host has two installing grooves and two opposite sidewalls, and the two installing grooves respectively penetrate through the two sidewalls. The two installing bases are disposed in the host, wherein each of the installing bases has an abutting portion and an installing portion connected to each other. The abutting portion of each of the installing bases abuts against an inner edge of the corresponding sidewall, and the installing portion of each of the installing bases is exposed outside of the host through the corresponding installing groove. The two connection elements are respectively installed onto the two installing portions of the two installing bases. The head belt has two opposite connection portions, and the two connection portions are respectively connected to the two connection elements.

Another embodiment of the invention provides a head-mounted display including a host, two installing bases, two connection elements, a first head belt and a supporting base. The host has two installing grooves and two opposite sidewalls, and the two installing grooves respectively penetrate through the two sidewalls. The two installing bases are disposed in the host, wherein each of the installing bases has an abutting portion and an installing portion connected to each other. The abutting portion of each of the installing bases abuts against an inner edge of the corresponding sidewall, and the installing portion of each of the installing bases is exposed outside of the host through the corresponding installing groove. The two connection elements are respectively installed onto the two installing portions of the two installing bases. The first head belt has two opposite connection portions. The two connection portions are respectively connected to the two connection elements. The supporting base is connected to the host via the first head belt, wherein the host is configured with a supporting portion at a side facing the supporting base, and the supporting portion has a first supporting point and a second supporting point opposite to each other. The supporting base has a third supporting point and a fourth supporting point opposite to each other, wherein the first supporting point and the third supporting point are connected into a first line segment, and the second supporting point and the fourth supporting point are connected into a second line segment. The first line segment and the second line segment are respectively located at two opposite sides of each of the connection portions.

Based on the above, the user can quickly remove and change the head belt based on the integrated design of the connection element and the head belt in the head-mounted display of the invention. On the other hand, based on the distribution design of the face supporting point of the host, the distribution design of the head supporting point of the supporting base and the connection relationship among the head belt, the host and the supporting base, the weight of the head-mounted display may be evenly distributed on different positions of the face and the head of the user in the process that the user wears the head-mounted display, so as to improve the comfort when the user wears the head-mounted display.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1A:
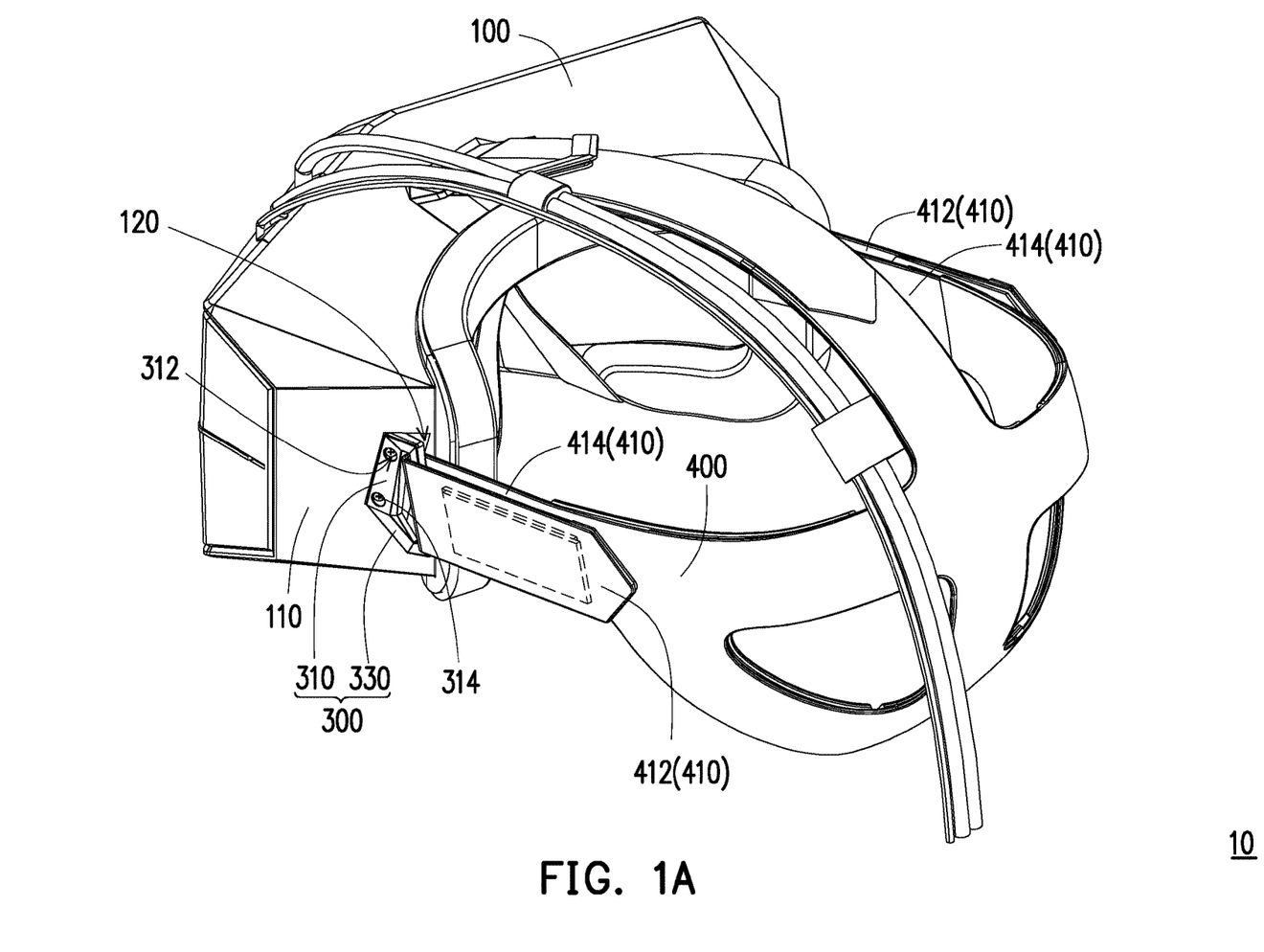
FIG. 1A is a schematic view illustrating a head-mounted display according to an embodiment of the invention.
Figure 1B:
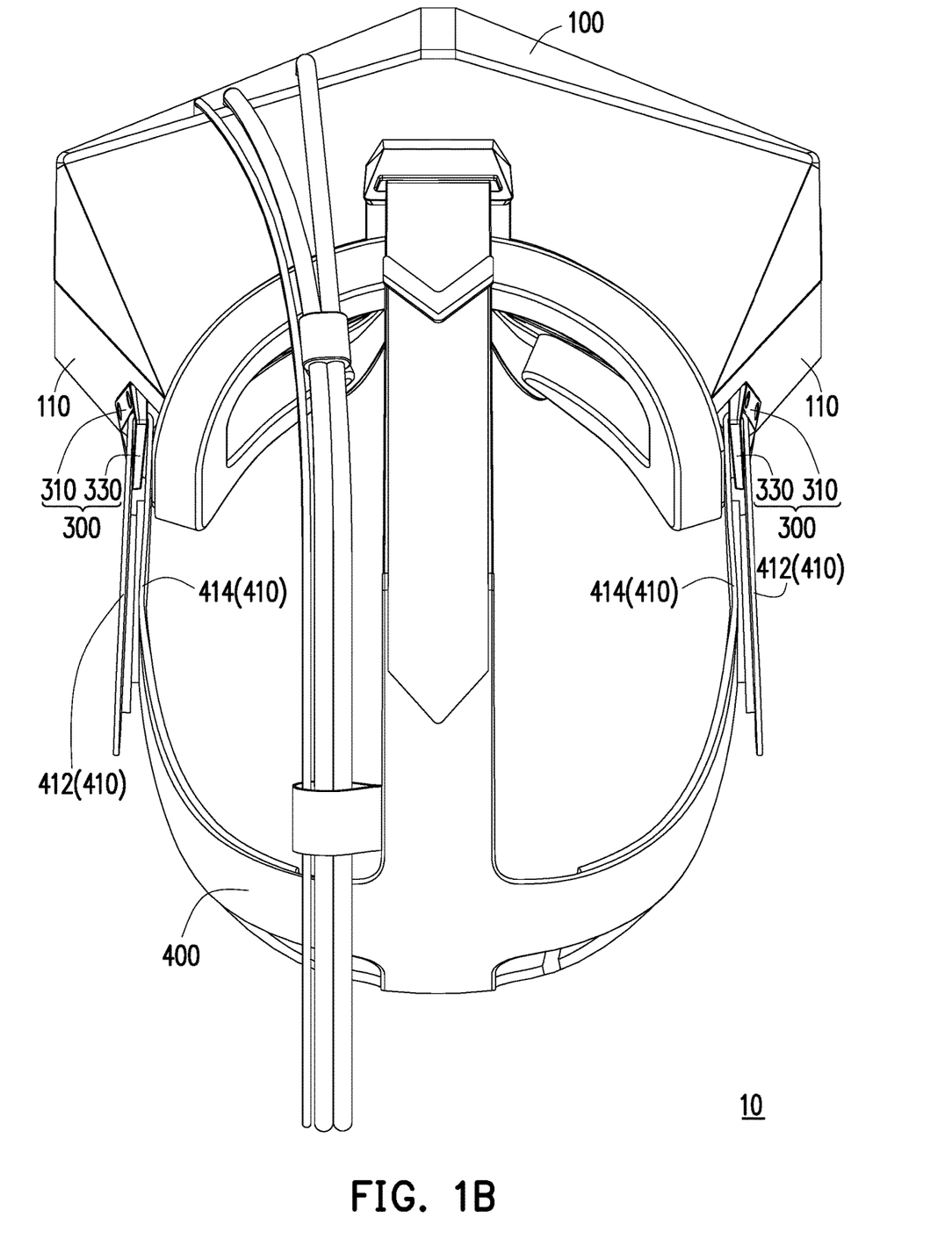
FIG. 1B is a schematic view illustrating the head-mounted display of FIG. 1A from another perspective.
Figure 1C:
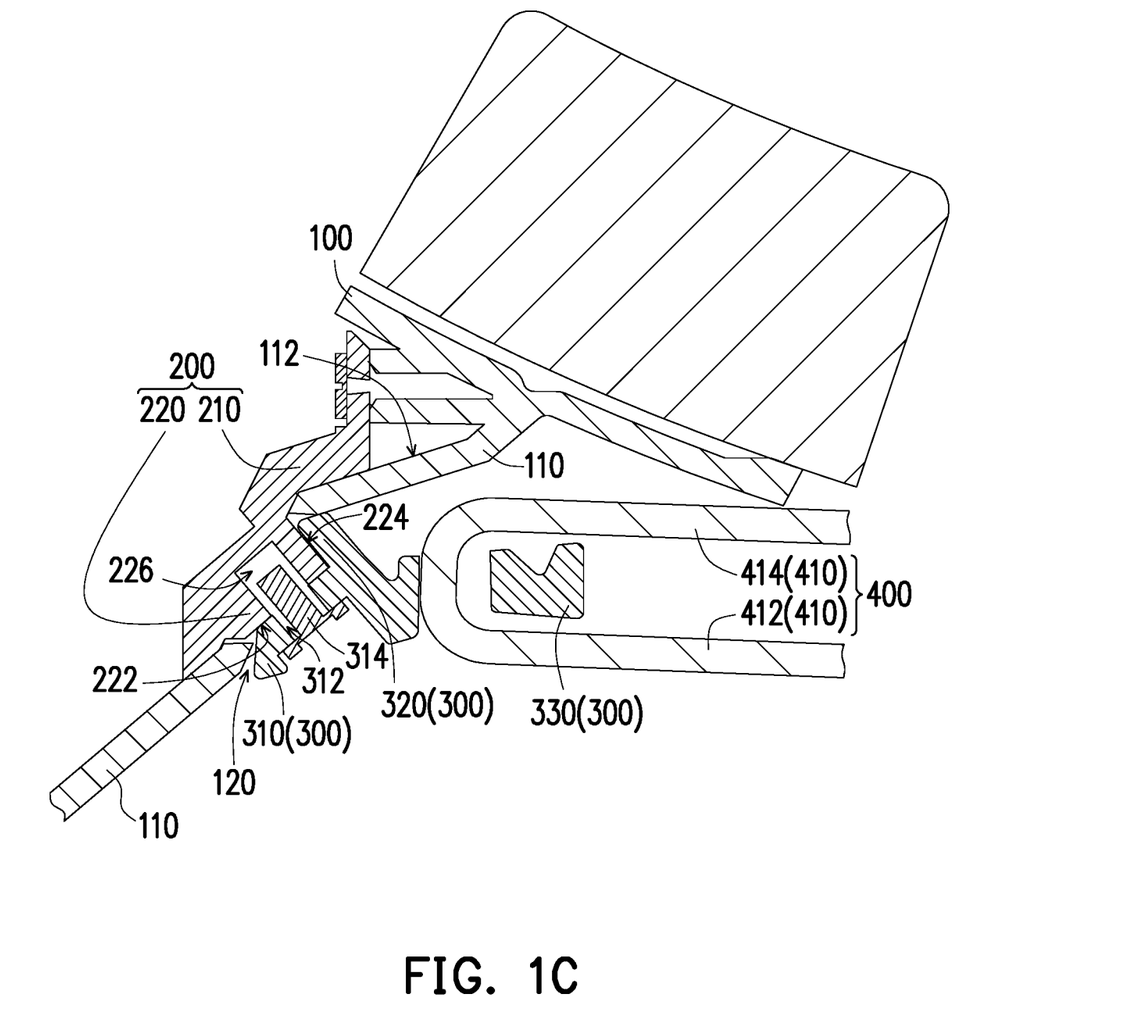
FIG. 1C is a schematic partial cross-sectional view illustrating the head-mounted display of FIG. 1A.

FIG. 1A is a schematic view illustrating a head-mounted display according to an embodiment of the invention. FIG. 1B is a schematic view illustrating the head-mounted display of FIG. 1A from another perspective. FIG. 1C is a schematic partial cross-sectional view illustrating the head-mounted display of FIG. 1A. It should be noted that the cross-sectional position of FIG. 1C is substantially at the location of an installing base 200 and a connection element 300. Referring to FIG. 1A to FIG. 1C, in the present embodiment, a head-mounted display 10 may be applied to the virtual reality, which includes a host 100, two installing bases 200, two connection elements 300 and a head belt 400. The host 100 is configured to receive electrical energy, send and receive signals or information, process signals or information and display images. The host 100 has two sidewalls 110 and two installing grooves 120, wherein the two sidewalls 110 are opposite to each other, and the two installing grooves 120 respectively penetrate through the two sidewalls 110.

Each of the installing bases 200 is disposed in the host 100, wherein each of the installing bases 200 has an abutting portion 210 and an installing portion 220 connected to each other. Each of the abutting portions 210 abuts against an inner edge 112 of the corresponding sidewall 110, and each of the installing portions 220 is exposed outside of the host 100 through the corresponding installing groove 120. The two connection elements 300 are respectively installed onto the two installing portions 220 of the two installing bases 200. Further, each of the installing portions 220 has an installing surface 222, a stop surface 224 connected to the installing surface 222 and at least one first installing hole 226 penetrating through the installing surface 222, wherein the installing surface 222 is configured to undertake the connection element 300, and the stop surface 224 is configured to limit the degree of freedom of movement of the connection element 300.

On the other hand, each of the connection elements 300 has a locking portion 310 and at least one second installing hole 312 penetrating through the locking portion 310. Each of the connection elements 300 abuts against the installing surface 222 of the corresponding installing portion 220 via the locking portion 310, and the first installing hole 226 is aligned with the corresponding second installing hole 312. Lastly, a locking member 314 is inserted into the second installing hole 312 and the first installing hole 226 aligned with each other and locked therein, so that each of the connection elements 300 is locked and fixed onto the corresponding installing base 200. For instance, the locking member 314 may be a rivet or a screw, and the invention does not limit the type of the locking member 314.

Further, each of the connection elements 300 further has a stop portion 320 located at a side of the locking portion 310, wherein each of the locking portions 310 and the corresponding stop portion 320 are perpendicular to each other, for example, and each of the installing surfaces 222 and the corresponding stop surface 224 are perpendicular to each other, for example. In the process of installing each of the connection elements 300 to the corresponding installing base 200, each of the locking portions 310 is firstly required to abut against the corresponding installing surface 222. Then, each of the stop portions 320 abuts against the corresponding stop surface 224. Thereafter, the position of each of the locking portions 310 corresponding to the installing surface 222 is slightly adjusted, so that each of the second installing holes 312 is aligned with the corresponding first installing hole 226. That is, based on the cooperation of each of the stop portions 320 and the corresponding stop surface 224, each of the connection elements 300 can be assembled to the proper and right position on the corresponding installing base 200, and the stability of each of the connection elements 300 after assembling to the corresponding installing base 200 is improved.

In the present embodiment, each of the connection elements 300 further has a buckle portion 330 connected to the locking portion 310 to provide the head belt 400 passes through therein. The head belt 400 is a flexible head belt, which has a larger deformation margin for the user to adjust the tightness of the head belt 400 according to the wearing requirements. Besides, the flexible head belt 400 may also has a cushion effect to avoid excessive pressure on the head, the face, or the ear of the user. The head belt 400 has two opposite connection portions 410 respectively connected to the two connection elements 300. Further, each of the connection portions 410 passes through and is fixed to the corresponding buckle portion 330, wherein each of the connection portions 410 has a first section 412 and a second section 414 connected to each other, and each of the first sections 412 is folded backward and combined with and fixed to the corresponding second section 414 after passing through the buckle portion 330 of the corresponding connection element 300. For instance, two combination surfaces where each of the first sections 412 and the corresponding second section 414 combined with each other may be configured with a velcro thereon, but the invention is not limited thereto. In other embodiments, two combination surfaces where each of the first sections and the corresponding second section combined with each other may be configured with a magnet, a latching structure, or a buckle structure thereon.

Other embodiments of the head-mounted display will be provided for description, wherein the same or similar elements are indicated by the same or similar reference labels, and the descriptions of the same or similar technical details are therefore omitted. The parts omitted from description may be referenced from the aforementioned embodiments and are not repeated below.

Figure 2A:
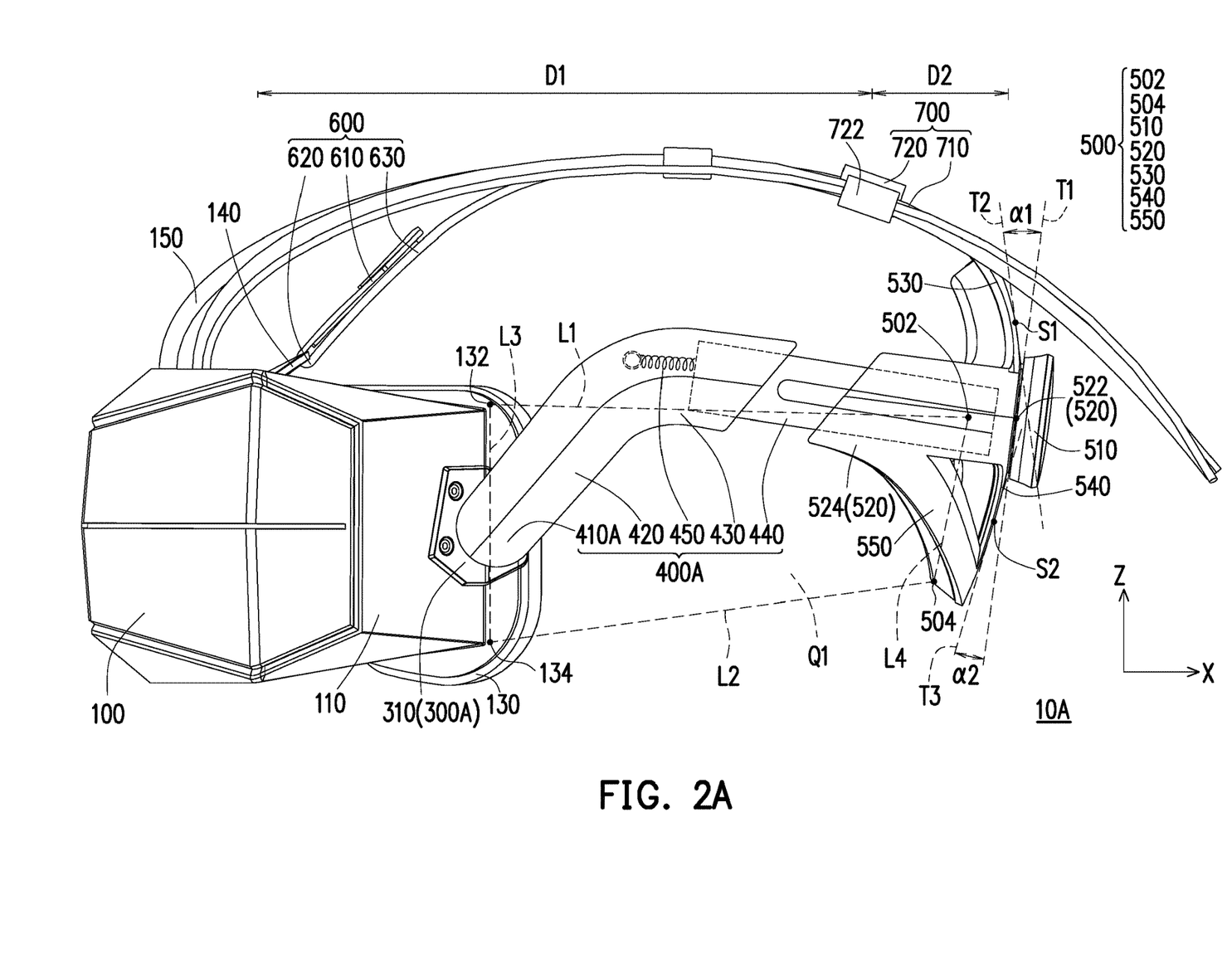
FIG. 2A is a schematic view illustrating a head-mounted display according to another embodiment of the invention.
Figure 2B:
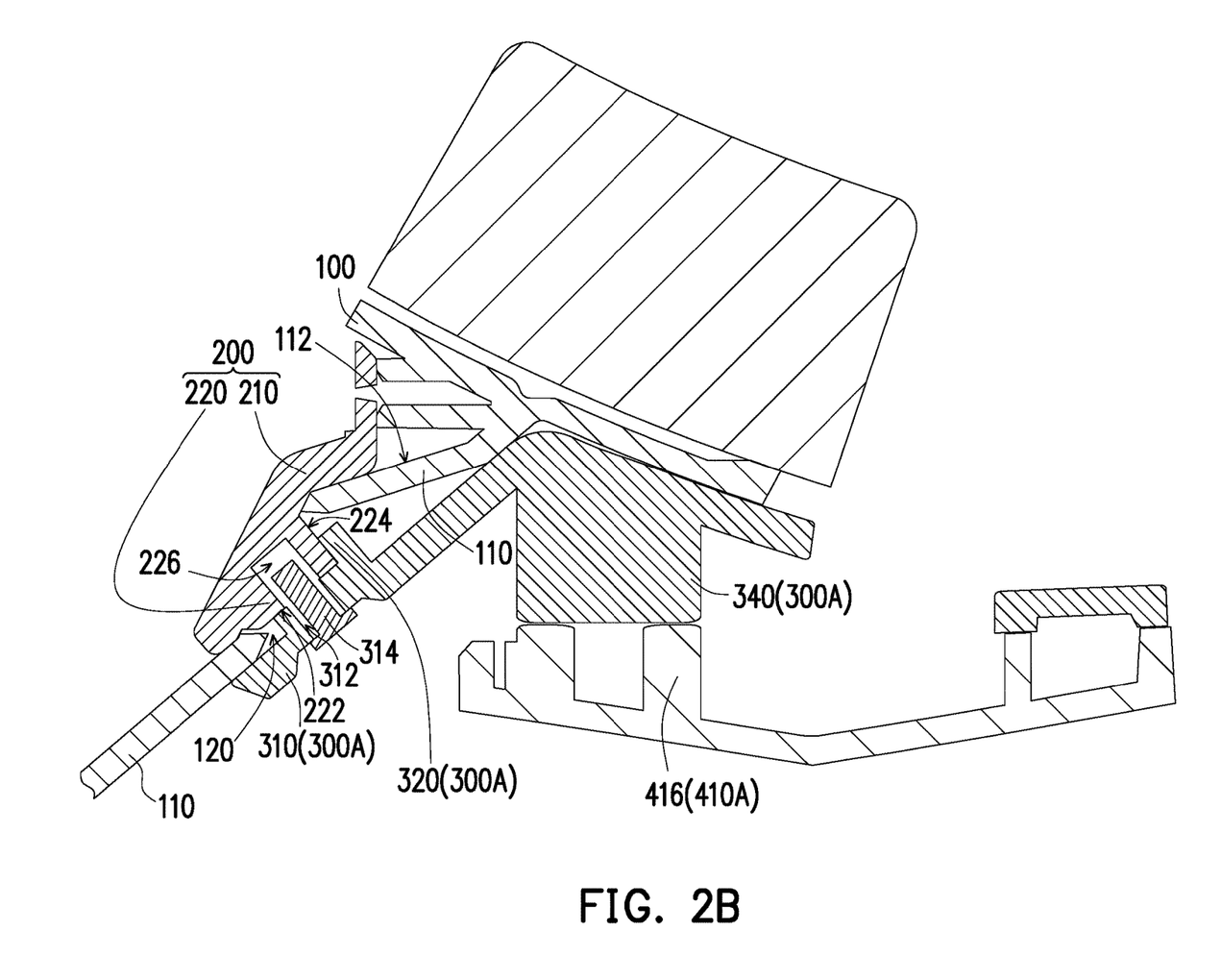
FIG. 2B is a schematic partial cross-sectional view illustrating the head-mounted display of FIG. 2A.
Figure 2C:
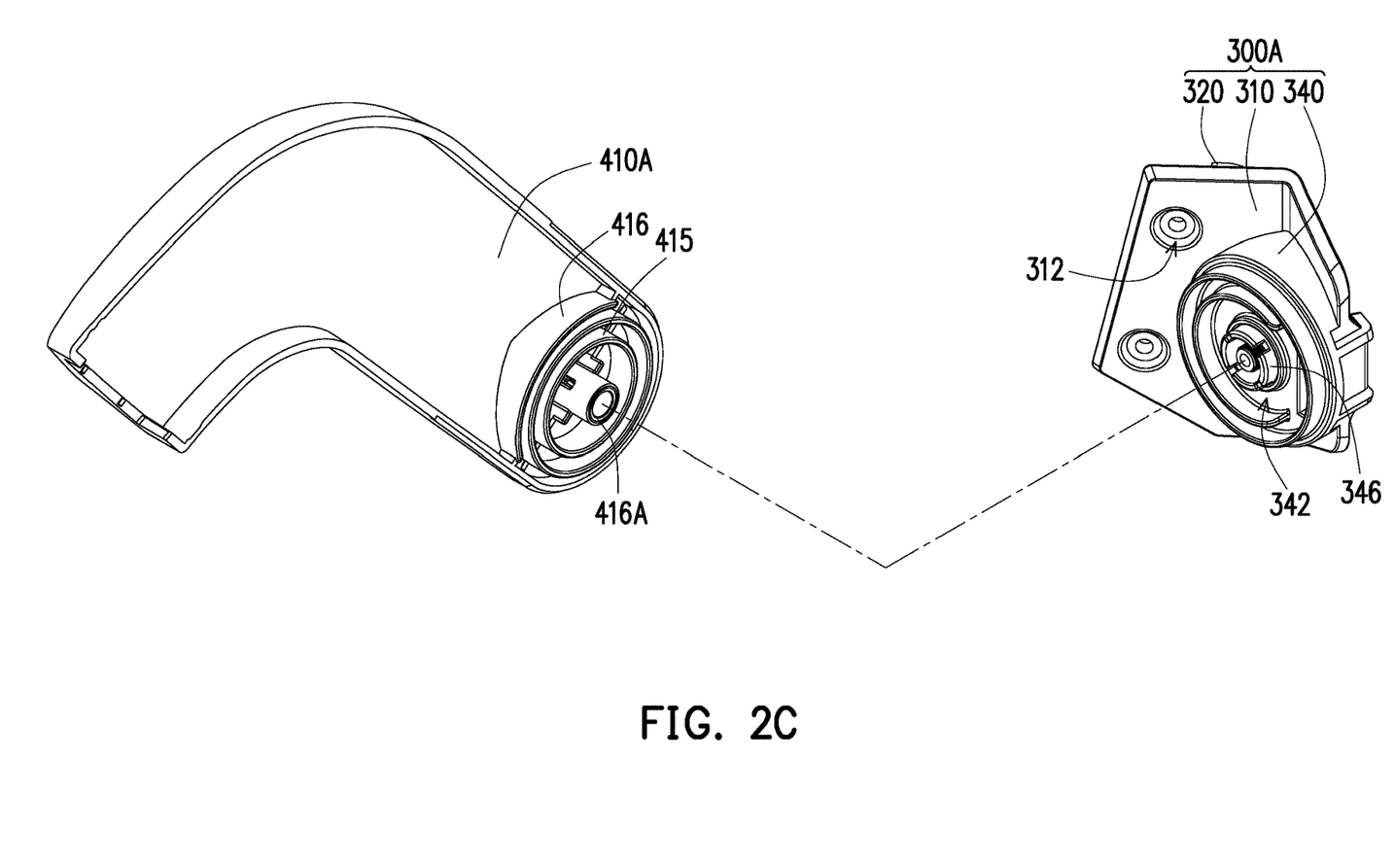
FIG. 2C is an exploded schematic view illustrating a connection element and a head belt of FIG. 2A.

FIG. 2A is a schematic view illustrating a head-mounted display according to another embodiment of the invention. FIG. 2B is a schematic partial cross-sectional view illustrating the head-mounted display of FIG. 2A. FIG. 2C is an exploded schematic view illustrating a connection element and a head belt of FIG. 2A. It should be noted that the cross-sectional position of FIG. 2B is substantially at the location of the installing base 200 and a connection element 300A. Referring to FIG. 2A to FIG. 2C, in the present embodiment, the installation method of the installing base 200 and the host 100 of a head-mounted display 10A, and the installation method of the connection element 300A and the installing base 200 may be referred to the descriptions of the aforementioned embodiments, and are not repeated herein. Further, each of the connection elements 300A is connected to the corresponding connection portion 410A of a first head belt 400A via a first pivot portion 340 adjacent to the locking portion 310.

The first head belt 400A is a rigid head belt, and each of the connection portions 410A is configured with a second pivot portion 416 and configured to be pivoted to the corresponding first pivot portion 340. That is, the first head belt 400A has the degree of freedom of rotating relative to the host 100. On the other hand, each of the first pivot portions 340 has at least one ring-shaped groove 342, and each of the second pivot portions 416 has at least one ring-shaped rib 415. The ring-shaped rib 415 of each of the second pivot portions 416 is inserted into and slidably disposed at the ring-shaped groove 342 of the corresponding first pivot portion 340, so as to improve the stability of each of the connection portions 410A being rotated relative to the corresponding connection element 300A. In other embodiments, the ring-shaped groove may be disposed at the second pivot portion, and the ring-shaped rib may be disposed at the first pivot portion.

As shown in FIG. 2C, each of the first pivot portions 340 further has a pivot base 346 surrounded by the ring-shaped groove 342, and each of the second pivot portions 416 further has a shaft 416A surrounded by the ring-shaped rib 415. Further, each of the shafts 416A is latched to the corresponding pivot base 346, so as to avoid that each of the second pivot portions 416 is easily separated from the corresponding first pivot portion 340. Since the pivot base 346 has the degree of freedom of rotating around an axis, each of the shafts 416A drives the pivot base 236 to rotate driven by the first head belt 400A when the user rotates the first head belt 400A. At the same time, each of the ring-shaped ribs 415 slides in the corresponding ring-shaped groove 342.

Referring to FIG. 2A to FIG. 2C, in the present embodiment, the head-mounted display 10A further includes a supporting base 500, wherein the first head belt 400A is configured to connect the host 100 and the supporting base 500, and the host 100 is configured with a supporting portion 130 at a side facing the supporting base 500. For instance, a side of the supporting base 500 facing the supporting portion 130 may be configured with latex, rubber, silicone or other soft and non-skid materials, and a side of the supporting portion 130 facing the supporting base 500 may also configured with latex, rubber, silicone or other soft and non-skid materials, so as to improve the comfort when the user wears the head-mounted display 10A and avoid the slippage of the head-mounted display 10A.

Particularly, the supporting portion 130 has a first supporting point 132 and a second supporting point 134 respectively located at two opposite sides of the connection element 300A. On the other hand, the supporting base 500 has a third supporting point 502 and a fourth supporting point 504 opposite to each other, wherein the first supporting point 132 and the third supporting point 502 are connected into a first line segment L1, and the second supporting point 134 and the fourth supporting point 504 are connected into a second line segment L2. The first line segment L1 and the second line segment L2 are not parallel to each other, and are respectively located at two opposite sides of the connection portion 410A or the connection element 300A. Secondly, the first supporting point 132 and the second supporting point 134 are connected into a third line segment L3, and the third supporting point 502 and the fourth supporting point 504 are connected to a fourth line segment L4. The first line segment L1, the third line segment L3, the second line segment L2 and the fourth line segment L4 are sequentially connected to form a quadrilateral Q1.

The first supporting point 132 and the second supporting point 134 are used for the face supporting point, and the third supporting point 502 and the fourth supporting point 504 are used for the head supporting point. Based on the support of the at least four aforementioned supporting points, the stability when the user wears the head-mounted display 10A is improved. Also, the weight of the head-mounted display 10A may be evenly distributed to the face and the head of the user via the at least four aforementioned supporting points, so as to improve the comfort when the user wears the head-mounted display 10A.

In the present embodiment, the first head belt 400A further includes two first extension portions 420, two second extension portions 430 and two retractable portions 440, wherein the two first extension portions 420 are respectively connected to the two connection portions 410A, and the two second extension portions 430 are respectively connected to the two first extension portions 420. Further, there is a turning between each of the first extension portions 420 and the corresponding second extension portion 430, and the first line segment L1 is substantially extended through the second extension portion 430. When the user wears the head-mounted display 10A, based on the design of the turning between each of the first extension portions 420 and the corresponding second extension portion 430, the first head belt 400A may bypass the ear of the user to avoid pressure on the ear of the user.

On the other hand, the two retractable portions 440 are respectively connected to the two second extension portions 430, wherein each of the second extension portions 430 is located between the corresponding first extension portion 420 and the retractable portion 440, and an end portion of each of the retractable portions 440 is coupled to the supporting base 500. Further, the supporting base 500 is configured with a knob 510 configured to be coupled to the end portion where each of the retractable portions 440 is extended into the supporting base 500. By rotating the knob 510, each of the retractable portions 440 may be driven to move relative to the supporting base 500, so as to adjust the length of the first head belt 400A. On the other hand, the first head belt 400A further includes at least two springs 450 respectively disposed in the two second extension portions 430. Two opposite ends of each of the springs 450 are respectively connected to the corresponding second extension portion 430 and another end portion where the retractable portion 440 is extended into the second extension portion 430. Although the length of the first head belt 400A is mainly determined by the length of which each of the retractable portions 440 is extended out of the supporting base 500, the length of the first head belt 400A may be slightly lengthened by each of the second extension portions 430 via the movement of the corresponding spring 450 relative to the retractable portion 440, which is convenient to wear or remove the head-mounted display 10A for the user.

In a condition that the length of which each of the retractable portions 440 extended out of the supporting base 500 is not change, the user may apply force to the host 100, so that each of the second extension portions 430 is moved toward a direction away from the supporting base 500. At this time, since the length of the first head belt 400A is slightly lengthened, the user can smoothly wear or remove the head-mounted display 10A. After removing the external force applied onto the host 100, each of the springs 450 returns to an initial state from a stretched state and drives the corresponding second extension portion 430 to move toward a direction close to the supporting base 500 to return to be positioned. For instance, the spring 450 may be a tension spring or a torsion spring.

Figure 2D:
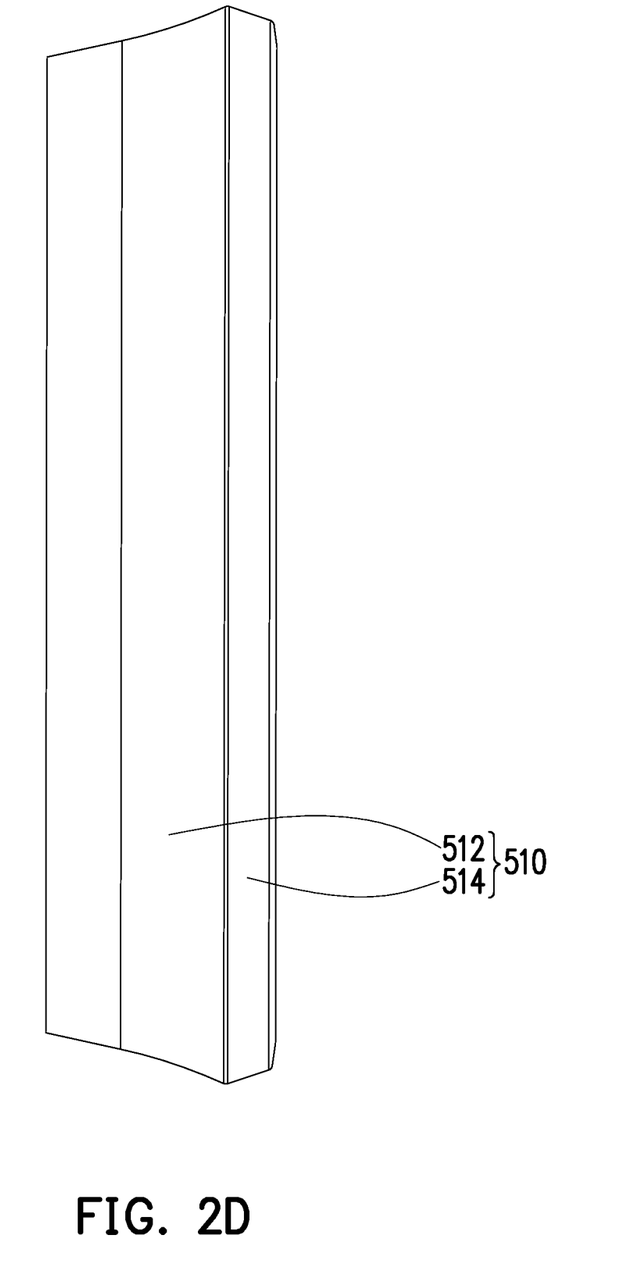
FIG. 2D is an enlarged schematic view illustrating a knob of FIG. 2A.

FIG. 2D is an enlarged schematic view illustrating a knob of FIG. 2A. Referring to FIG. 2A and FIG. 2D, in the present embodiment, the knob 510 has a first holding portion 512 and a second holding portion 514, and the first holding portion 512 is located between the supporting base 500 and the second holding portion 514. An outer diameter of the first holding portion 512 is gradually expanded from the supporting base 500 toward the second holding portion 514, and an outer diameter of the second holding portion 514 is gradually shrunk from the first holding portion 512 toward a direction away from the supporting base 500. Based on the aforementioned design of the outer diameter, the first holding portion 512 is adapted to allow the fingertip of the user to hold the knob 510 indeed, and the second holding portion 514 is adapted to allow the finger pulp of the user to abut against the knob 510 indeed. Thus, it helps the user to apply force to the knob 510 and rotate the knob 510.

Figure 2E:
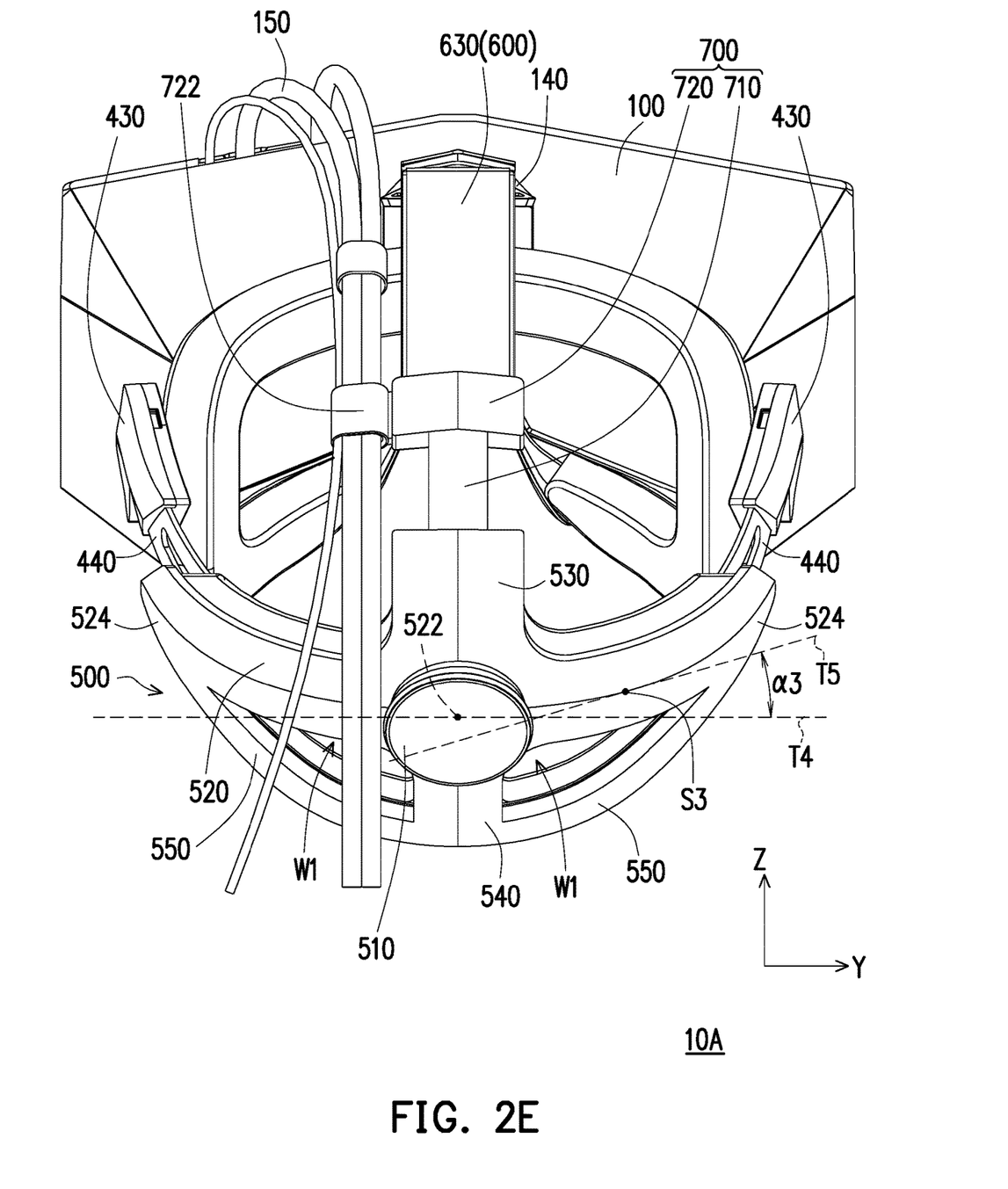
FIG. 2E is a schematic view illustrating the head-mounted display of FIG. 2A from another perspective.

FIG. 2E is a schematic view illustrating the head-mounted display of FIG. 2A from another perspective. Referring to FIG. 2A and FIG. 2E, in the present embodiment, the head-mounted display 10A further includes a second head belt 600 and a flexible member 700, wherein two opposite ends of the second head belt 600 are respectively connected to the host 100 and the flexible member 700. The second head belt 600 is a flexible head belt, which has a larger deformation margin for the user to adjust the tightness of the second head belt 600 according to the wearing requirements. Besides, the flexible head belt may also have a cushion effect to avoid excessive pressure on the head of the user. The second head belt 600 is located between the two connection portions 410A and connected to the supporting base 500 via the flexible member 700.

Particularly, the host 100 includes a buckle 140, and the second head belt 600 passes through and is fixed to the buckle 140. The second head belt 600 has a first section 610, a second section 620 and a third section 630, and the second section 620 is connected to the first section 610 and the third section 630. The first section 610 is folded backward and combined with and fixed to the third section 630 after passing through the buckle 140, and the second section 620 is buckled to the buckle 140. For instance, two combination surfaces where the first sections 610 and the third section 630 combined with each other may be configured with a velcro thereon, but the invention is not limited thereto. Based on the configuration of the velcro, an elastic modulus of the second section 620 is smaller than elastic modului of the first section 610 and the third section 630. That is, when the second head belt 600 is stretched, the second section 620 has a larger deformation margin compared with the first section 610 and the third section 630, which is convenient to wear and the remove the head-mounted display 10A for the user. For instance, the back surface opposite to the combination surface of the first section 610 may be configured with an indicative structure or label, so that the user can determine the direction of the combination and fixation of the first section 610 and the third section 630 by touching the indicative structure or label. In other embodiments, two combination surfaces where each of the first sections and the corresponding third section combined with each other may be configured with a magnet, a latching structure, or a buckle structure thereon.

On the other hand, the flexible member 700 is located between the two connection portions 410, wherein the flexible member 700 includes a flexible portion 710 and a transition portion 720. The flexible portion 710 is connected to the supporting base 500, and the transition portion 720 is connected to the third section 630 and the flexible portion 710. The material of the flexible portion 710 is more flexible than the material of the supporting base 500 and is more resilient than the material of the second head belt 600. Thus, it not only can be moderately deformed to fit the head shape of the user, but also provide enough tension to support the second head belt 600. In the present embodiment, the transition portion 720 is located between the third section 630 and the flexible portion 710, and a side of the transition portion 720 is configured with a cable organizer 722 configured to accommodate at least one trace 150 connected to the host 100.

The trace 150 is configured to transmit signals, information or electrical energy, and the trace 150 is able to slidably move relative to the cable organizer 722, so as to avoid that the head-mounted display 10A is deflected or dropped by the pulling of the trace 150. In addition, a distance D1 between the transition portion 720 and the host 100 is larger than a distance D2 between the transition portion 720 and the supporting base 500. Further, when the user wears the head-mounted display 10A, the position of the transition portion 720 and the cable organize 722 is substantially located on the top of the head of the user and relatively close to the back of the head. Under such design, the action of adjusting the length of the second head belt 600 by the user would not be influenced.

Referring to FIG. 2A and FIG. 2E, in the present embodiment, the supporting base 500 includes a first bracket 520, a second bracket 530, a third bracket 540 and two fourth brackets 550, wherein the first bracket 520 may be an arc bracket and have a central portion 522 and two first end portions 524 located at two opposite sides of the central portion 522. The central portion 522 corresponds to the flexible member 700, wherein the knob 510 is disposed at the central portion 522, and the two first end portions 524 are connected to the first head belt 400A. The second bracket 530 may be an arc bracket, which is outwardly extended from a side of the central portion 522 and connected to the flexible portion 710. The third bracket 540 may be an arc bracket, which is outwardly extended from another side of the central portion 522 and connected to the two fourth brackets 550. The two fourth brackets 550 may be arc brackets, which are respectively outwardly extended from the third bracket 540 and respectively connected to the two first end portions 524. Further, the first bracket 520 and the two fourth bracket 550 surround a window opening space, and the window opening space is divided into two window opening regions W1 arranged side by side by the third bracket 540 across the window opening space. Based on the structural design of the aforementioned supporting base 500, the weight of the head-mounted display 10A may be more evenly distributed on the back of the head of the user.

To optimize and accelerate the process of wearing the head-mounted display 10A, each of the retractable portions 440 and the flexible portion 710 are respectively coupled to the knob 510, and each of the retractable portions 440 and the flexible portion 710 are adapted to be driven by the knob 510 to move relative to the supporting base 500. Further, when the user rotates the knob 510, each of the retractable portions 440 and the flexible portion 710 are synchronously moved relative to the supporting base 500, and a ratio of the distance that each of the retractable portions 440 moves relative to the supporting base 500 to the distance that the flexible portion 710 moves relative to the supporting base 500 is about 7:4. That is, the user can synchronously drive each of the retractable portions 440 and the flexible portion 710 to adjust the tightness of the head-mounted display 10A when wearing on the head by just rotating the knob 510.

Referring to FIG. 2A and FIG. 2E, in order to response the variation of the head shape of different people in East and West, the supporting base 500 is designed with a special curvature. On the X-Z plane, a tangent T1 passes through the central portion 522 of the first bracket 520, such as passing through a central point of the central portion 522. A tangent T2 passes through the second bracket 530, such as passing through a position S1 displaced by a small distance in a direction from the central portion 522 toward the second bracket 530. A tangent T3 passes through the third bracket 540, such as passing through a position S2 displaced by a small distance in a direction from the central portion 522 toward the third bracket 540. A first included angle α1 between the tangent T1 and the tangent T2 may be 13 degrees, and a second included angle α2 between the tangent T1 and the tangent T3 may be 6 degrees. On the Y-Z plane, a tangent T4 passes through the central portion 522 of the first bracket 520, such as passing through a central point of the central portion 522. A tangent T5 passes through a section located between the central portion 522 and any of the first end portions 524, such as passing through a position S3 displaced by a small distance in a direction from the central portion 522 toward any of the first end portions 524. A third included angle α3 between the tangent T4 and the tangent T5 may be 9 degrees. The design of the above parameters is an average value obtained according to the head shape of different people in East and West.

It should be noted that any element of the head-mounted display 10A that will contact the head, the face, or other parts of the user may be made of antibacterial, breathable, or hydrophobic materials for personal hygiene.

In summary, the user can quickly remove and change the head belt based on the integrated design of the connection element and the head belt in the head-mounted display of the invention. On the other hand, based on the distribution design of the face supporting point of the host, the distribution design of the head supporting point of the supporting base and the connection relationship among the head belt, the host and the supporting base, the weight of the head-mounted display may be evenly distributed on different positions of the face and the head of the user in the process that the user wears the head-mounted display, so as to improve the comfort when the user wears the head-mounted display.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A head-mounted display, comprising:
a host, having two installing grooves and two opposite sidewalls, and the two installing grooves respectively penetrating through the two sidewalls;
two installing bases, fixed inside the host, wherein each of the installing bases has an abutting portion and an installing portion connected to each other, the abutting portion of each of the installing bases abuts against an inner edge of the corresponding sidewall, and the installing portion of each of the installing bases is exposed outside of the host through the corresponding installing groove;
two connection elements, respectively detachably installed onto the two installing portions of the two installing bases;
at least one locking member, passing through one of the two connection elements and inserted into one of the two installing bases to lock the one of the two connection elements onto the one of the two installing bases; and
a head belt, having two opposite connection portions, and the two connection portions being respectively connected to the two connection elements.

2. The head-mounted display according to claim 1, wherein each of the installing portions has an installing surface, a stop surface connected to the installing surface, and at least one first installing hole penetrating through the installing surface, and each of the connection elements has a locking portion and at least one second installing hole penetrating through the locking portion, each of the locking portions abuts against the installing surface of the corresponding installing portion, and each of the first installing holes is aligned with the corresponding second installing hole and locked by the at least one locking member therein.

3. The head-mounted display according to claim 2, wherein each of the connection elements further has a stop portion located at one side of the corresponding locking portion, and each of the stop portions abuts against the corresponding stop surface.

4. The head-mounted display according to claim 2, wherein each of the connection elements further has a buckle portion connected to the corresponding locking portion, the head belt is a flexible head belt, and the two connection portions respectively pass through and are fixed to the two buckle portions.

5. The head-mounted display according to claim 4, wherein each of the connection portions has a first section and a second section, and the first section of each of the connection portions is folded backward and combined with and fixed to the corresponding second section after passing through the buckle portion of the corresponding connection element.

6. The head-mounted display according to claim 2, wherein each of the connection elements has a first pivot portion adjacent to the locking portion and each of the connection portions is configured with a second pivot portion pivoted to the corresponding first pivot portion.

7. The head-mounted display according to claim 6, wherein each of the first pivot portions has at least one ring-shaped groove, and each of the second pivot portions has at least one ring-shaped rib, the ring-shaped rib of each of the second pivot portions is inserted into and slidably disposed at the ring-shaped groove of the corresponding first pivot portion.

8. The head-mounted display according to claim 7, wherein each of the first pivot portions further has a pivot base surrounded by the ring-shaped groove, each of the second pivot portions further has a shaft surrounded by the ring-shaped rib, and the shaft of each of the second pivot portions is latched to the pivot base of the corresponding first pivot portion.

9. A head-mounted display, comprising:
a host, having two installing grooves and two opposite sidewalls, and the two installing grooves respectively penetrating through the two sidewalls;
two installing bases, fixed inside the host, wherein each of the installing bases has an abutting portion and an installing portion connected to each other, the abutting portion of each of the installing bases abuts against an inner edge of the corresponding sidewall, and the installing portion of each of the installing bases is exposed outside of the host through the corresponding installing groove;
two connection elements, respectively detachably installed onto the two installing portions of the two installing bases;

at least one locking member, passing through one of the two connection elements and inserted into one of the two installing bases to lock the one of the two connection elements onto the one of the two installing bases;

a first head belt, having two opposite connection portions, the two connection portions being respectively connected to the two connection elements; and a supporting base, connected to the host via the first head belt, wherein the host is configured with a supporting portion at a side facing the supporting base, and the supporting portion has a first supporting point and a second supporting point opposite to each other, the supporting base has a third supporting point and a fourth supporting point opposite to each other, wherein the first supporting point and the third supporting point are connected into a first line segment, and the second supporting point and the fourth supporting point are connected into a second line segment, the first line segment and the second line segment are respectively located at two opposite sides of each of the connection portions.

10. The head-mounted display according to claim 9, wherein the first supporting point and the second supporting point are connected into a third line segment, and the third supporting point and the fourth supporting point are connected to a fourth line segment, the first line segment, the third line segment, the second line segment and the fourth line segment are sequentially connected to form a quadrilateral.

11. The head-mounted display according to claim 9, wherein the first head belt further comprises:

two first extension portions, respectively connected to the two connection portions;

two second extension portions, respectively connected to the two first extension portions, and there is a turning between each of the first extension portions and the corresponding second extension portion; and two retractable portions, respectively connected to the two second extension portions, wherein each of the second extension portions is located between the corresponding first extension portion and the retractable portion, and each of the retractable portions is coupled to the supporting base.

12. The head-mounted display according to claim 11, wherein the supporting base is configured with a knob coupled to a part where each of the retractable portions is extended into the supporting base and configured to drive each of the retractable portions to move relative to the supporting base.

13. The head-mounted display according to claim 12, wherein the knob has a first holding portion and a second holding portion, and the first holding portion is located between the supporting base and the second holding portion, an outer diameter of the first holding portion is gradually expanded from the supporting base toward the second holding portion, and an outer diameter the second holding portion is gradually shrunk from the first holding portion toward a direction away from the supporting base.

14. The head-mounted display according to claim 11, wherein the first head belt further comprises at least two springs respectively disposed in the two second extension portions, and two opposite ends of each of the springs are respectively connected to the corresponding second extension portion and a part where the retractable portion is extended into the second extension portion.

15. The head-mounted display according to claim 9, further comprising:

a second head belt, located between the two connection portions, wherein the host comprises a buckle, and the second head belt has a first section, a second section and a third section, the second section is connected to the first section and the third section, wherein the first section is folded backward and combined with and fixed to the third section after passing through the buckle, and the second section is buckled to the buckle; and a flexible member, located between the two connection portions, wherein the flexible member comprises a flexible portion and a transition portion, the flexible portion is connected to the supporting base, and the transition portion is connected to the third section and the flexible portion.

16. The head-mounted display according to claim 15, wherein an elastic modulus of the second section is smaller than elastic modului of the first section and the third section.

17. The head-mounted display according to claim 15, wherein a side of the transition portion is configured with a cable organize configured to accommodate at least one trace connected to the host.

18. The head-mounted display according to claim 15, wherein a distance between the transition portion and the host is larger than a distance between the transition portion and the supporting base.

19. The head-mounted display according to claim 15, wherein the supporting base comprises a first bracket, a second bracket, a third bracket and two fourth brackets, the first bracket has a central portion and two first end portions located at two opposite sides of the central portion, and the two first end portions are connected to the first head belt, the second bracket is outwardly extended from one side of the central portion and connected to the flexible portion, and the third bracket is outwardly extended from another side of the central portion and connected to the two fourth brackets, the two fourth brackets are respectively outwardly extended from the third bracket and respectively connected to the two first end portions.

20. The head-mounted display according to claim 19, wherein the first bracket, the third bracket and the fourth bracket define two window opening regions arranged side by side.

* * * * *